May 13, 1958     H. H. KOPPEL     2,834,934
MAGNETIC INVERTER CIRCUIT

Filed Oct. 19, 1953     2 Sheets-Sheet 2

INVENTOR.
HAROLD H. KOPPEL
BY
Raymond D. Junkins
ATTORNEY

United States Patent Office 2,834,934
Patented May 13, 1958

2,834,934

MAGNETIC INVERTER CIRCUIT

Harold H. Koppel, South Euclid, Ohio, assignor to Bailey Meter Company, a corporation of Delaware Application October 19, 1953, Serial No. 386,870

6 Claims. (Cl. 323—56)

This invention relates to a system for measuring and/or controlling the magnitude of a variable, such as temperature, pressure, rate of fluid flow, position or displacement, although the variable may be of any chemical, physical, electrical, thermal or other characteristic.

In accordance with my invention, variations in a variable quantity, quality or condition are translated into variations of an electrical effect, and this effect is then amplified solely through electrical means until sufficient power is available for doing useful work, such as moving an indicator or other exhibiting means, or for regulating the rate of application of an agent contributing to the production or maintenance of the variable.

The prior art to this invention is represented by at least the patents La Pierre 2,053,154; Fitzgerald 2,277,849; Fitzgerald 2,464,639 and Hornfeck 2,529,450. It is to be noted that these patents disclose measuring and controlling systems which utilize magnetic amplifiers (magamps) for the inversion of relatively low level D.-C. signals representative of variables into greatly amplified A.-C. signals. These devices are to be distinguished from the low-level D.-C. measuring systems, such as thermocouple-potentiometer recorders using galvanometers for detecting or measuring the D.-C. input. A galvanometer is a relatively fragile device and is affected by mechanical vibration and easily damaged by overload or mishandling. Vacuum tubes or electronic amplifiers for low D.-C. voltages have not been successful because of instability and drift. The particular object of the present invention is to provide apparatus for detecting and amplifying small D.-C. voltages by what is commonly known as a saturable reactor. A complete, operable system incorporating a saturable reactor is termed a magnetic amplifier (magamp) and is capable of converting a D.-C. signal of reversing polarity into a greatly amplified A.-C. signal of reversing phase. This type of apparatus has all of the sensitivity of a galvanometer as well as the sturdiness of a transformer. There are no delicate moving mechanical parts to wear out or to be damaged.

After a study of the various systems represented by at least the aforementioned patents, I have conceived and brought to completion a circuit which is superior to any circuit previously offered. The circuit materially reduces the number of magnetic core structures required to practice an invention such as Hornfeck 2,529,450, and I have provided adjustments which give all the flexibility desired in the functioning of the device.

A general object of the present invention is to invert a low-level D.-C. signal of reversible polarity, into an A.-C. voltage of reversible phase by electro-magnetic structure.

Another object is to accomplish the desired inversion with the minimum number of parts compatible with the desired flexibility of operation.

Another object is to accomplish the inversion by producing an A.-C. voltage having a frequency which is a fundamental of the A.-C. voltage power required for the electromagnetic structure.

Still another object is to provide a magnetic amplifier whose quadrature component in its A.-C. output can be adjusted and whose null condition can be obtained by manual adjustment to compensate for permanent and transient variations of performance between the magnetic core structures of the device.

Figure 1:
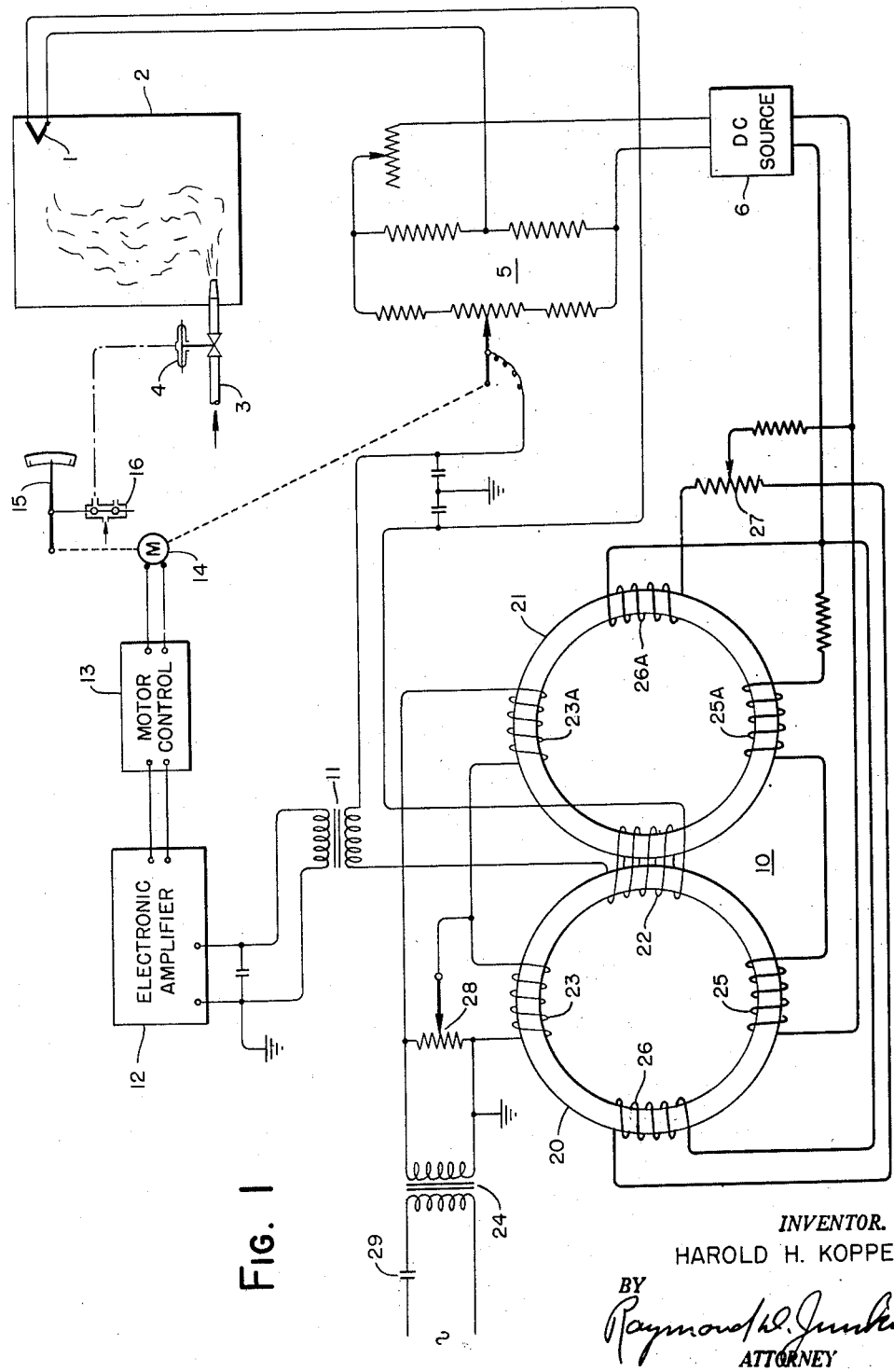
Fig. 1 is a wiring diagram illustrating a complete system embodying my invention.

Fig. 1 is a schematic wiring diagram of a measuring and control system embodying the present invention. Herein I have illustrated a thermocouple 1 located within the furnace 2, sensitive to the temperature therein, and to which fuel is supplied through a pipe 3 under the control of a pneumatically actuated valve 4. The thermocouple 1 is connected in a potentiometric measuring network 5 which compares the thermocouple voltage with that of a reference source of constant D.-C. indicated at 6. It is to be noted that no standard reference source of D.-C. is provided as in Hornfeck 2,529,450 because of the contemplation of using subsequently developed sources of D.-C. at 6 which do not vary beyond predetermined limits during their life.

From a perspective consideration, it can be ascertained that the D.-C. generated at thermocouple 1 is the original, variable signal. This low-level D.-C. controls the measuring network 5 as it establishes a D.-C. output of reversing polarity. It is network 5 which gives the null balance characteristic necessary for measuring and controlling functions.

Very generally, the D.-C. of reversible polarity from the potentiometric system 5 is taken into magamp 10 which inverts it into an A.-C. signal of reversible phase and magnitude proportional to that of the D.-C. Magamp 10 functions to deliver its A.-C. signal to the primary of output transformer 11 where the final steps of amplification of the original signal of the thermocouple begin to take place. The magamp 10 output of A.-C. is larger than the D.-C. input. The output transformer 11 steps the A.-C. signal up further. An electronic tube amplifier 12 greatly amplifies the A.-C. signal and causes motor control network 13 to direct motor 14 which gives the mechanical motion to rebalance circuit 5 to null and simultaneously actuate indicator 15 and pneumatic pilot valve 16 for positioning fuel valve 4.

I have purposely represented the electronic amplifier 12 and motor control 13 as diagrammatic blocks in the disclosure of Fig. 1. There are several well-known circuits which perform the functions required of these devices in the system of Fig. 1. Therefore, instead of disclosing and describing in detail the circuits, they have been generally indicated with the understanding that specific devices are disclosed and claimed in at least Ryder 2,275,317; Ryder, 2,333,393 and Hornfeck 2,544,790 which may be referred to for specific, satisfactory circuits for these functions.

Certain over-all requirements of these components of the system thus far described should be understood. Considering the motor 14 as a capacitor-run motor it is well understood that the principle of operation calls for both of the two windings of these motors to be supplied the available line voltage but with the voltage of one winding shifted ninety degrees from that of the other. The preferred arrangement is made by a capacitor in series with the so-called reference winding. The other winding is termed the control winding and it is necessary that its voltage be in phase with the line voltage for proper operation. The magamp 10, in common with all electro-magnetic structures, distorts the output voltage phase in relation to the power voltage phase. Therefore, I have provided a phase-shifting capacitor in the power circuit of the magamp. This component will be pointed out in the following description.

Another over-all requirement is that the control winding voltage of the motor 14 be of the fundamental frequency of the line voltage. Considering 60-cycle voltage as being the more common supply available, if the inversion by the magamp 10 produced a control voltage other than 60 cycles a special electronic amplifier and motor would have to be provided. These amplifiers and motors are awkward to design and stock in manufacture based on 60-cycle equipment. Further, the speed of response of such magamp is comparatively low when the D.-C. input signal is as low as contemplated in the present embodiment of the invention. With the inversion of D.-C. to 60-cycle A.-C., the higher speed motors can be used. Therefore, the present invention has accomplished the object of providing the desired frequency of output with means for adjusting the null condition of the magamp as well as providing for elimination of the quadrature component of the voltage.

The D.-C. reference source 6 necessary in the potentiometric circuit 5 can also be put to use in the bias circuit of magamp 10. Circuit provisions have been made in order to place the minimum of drain upon this device 6 in order to give it the greatest length of life possible. The specific bias circuit arrangement will be taken up in its proper order, subsequently.

Heretofore, I have broadly indicated the three circuits of the magamp embodying my invention. The windings of these circuits are arranged on toroidal cores 20 and 21 in order to comprise the specific form of saturable reactor which is the heart of the magamp 10. These windings have been diagrammatically depicted as individually composed of relatively few windings. Actually, the number of windings required for the power carried by the magamp call for enough windings to extend around the complete winding space provided by these cores. This means that the windings are wound on top of each other which is a desirable feature in saturable reactors to obtain maximum magnetic linkage by the fluxes produced by the windings. Although toroidal cores are quite popular at present, the initially developed transformer shapes could be used to practice the invention as disclosed. The specific form and arrangement of the saturable reactor disclosed in Fig. 1 represents a compromise between the arrangements which may have been used in order to obtain maximum clarity of illustration.

The input winding 22 is shown wound common to both of the cores. Practically speaking it is possible to break this winding into two sections, each section individually associated with one of the cores. Windings 23 and 23A are designed to carry the A.-C. power input to the saturable reactor. It may be observed that these power windings are connected in a simple loop circuit with a secondary of power transformer 24 having its primary energized from the source of line voltage. Windings 25, 25A and 26, 26A carry D.-C. energy in order to supply M. M. F. to function as will be specifically described. The constant current D.-C. source 6 is arranged to energize the two sets of bias windings in parallel.

It would be well, at this point, to compare the embodiment of Fig. 1 with the bridge circuit of Hornfeck 2,529,450. In the Hornfeck system the saturable reactors are, essentially, adjacent legs of a Wheatstone bridge. In the Hornfeck circuit the D.-C. input establishes a series of M. M. F.'s which influence the impedance of the adjacent bridge legs so as to reduce the impedance in one leg or the other, depending on the polarity of the D.-C. input. This results in the power applied to the conjugates of the bridge being transmitted to the opposite conjugates through the adjacent leg selected by the D.-C. polarity. The voltage taken from the output conjugates of the bridge is a fundamental of the line supply to the bridge and is varied in magnitude by the strength of the D.-C. input.

In the arrangement of Fig. 1 there is no bridge. The power windings 23 and 23A induce A.-C. M. M. F.'s into a loop circuit including thermocouple 1, winding 22, potentiometric measuring system 5 and the primary of output transformer 11. The A.-C. induced in this loop circuit is controlled by the variable signal D.-C. of the thermocouple and is taken from the output transformer 11 secondary as proportional to the variable. It is the arrangement whereby the power is induced into the output circuit through cores 20 and 21 that characterizes this circuit generally as a transformer type of magamp. There are other distinguishing characteristics, such as the fact that the variable signal is carried in the same circuit as both the induced power and the output terminals. As thus far described the arrangement is not uncommon in the art as practiced. However, without additional circuit elements, the output A.-C. of such transformer type of magamp is inherently the second harmonic of the fundamental frequency of the line supply of the power windings.

The present invention brings a D.-C. bias into the picture and additionally establishes this bias in an entirely separate circuit for advantages of adjusting operating characteristics. Conventionally the D.-C. bias of magamps is employed for establishing the optimum operating point of the saturable reactor with a respect to the hysteresis loop of the cores. Bias windings 25, 25A and 26, 26A perform this function but also combine with the M. M. F.'s induced by the other windings to cause the A.-C. voltage of the output to be given the fundamental frequency of the line voltage.

Specifically this function of the saturable reactor of magamp 10 may be seen by first observing that the bias and A.-C. windings are wound in opposing sense on their respective cores. The D.-C. input windings are wound in aiding sense on both cores. Thus, in the absence of the D.-C. input signal, the two cores always have equal M. M. F. impressed in them and the voltages induced in the windings 22 are cancelled, precluding any A.-C. output. Then when a D.-C. input signal is applied to windings 22 the resulting M. M. F. adds to the M. M. F. of the bias winding, and the A.-C. power M. M. F., in one core while subtracting from them in the second core on the first half cycle of the A.-C. voltage. This drives the first core to a higher level of saturation and the second core to a lower level of saturation. Therefore, the inductance of the D.-C. input winding due to the first core will decrease while the inductance of the D.-C. winding due to the second core will increase to cause the induced voltage from the second core to be higher than that in the first core and produce a net output voltage this first half cycle of the A.-C. power voltage.

On the next half cycle of the A.-C. power voltage, the bias and A.-C. power voltage M. M. F.'s subtract so that the level of saturation, even without a D.-C. input, is much lower than before in both cores. Thus a D.-C. input, generally quite small when compared to the A.-C. and bias M. M. F., will not bring the core into a region of high saturation. Therefore, the difference in inductances of the two cores into the D.-C. input winding will be low and the output voltage will be substantially zero on this second half cycle.

Now when the D. C. input is reversed in polarity, and during the first half cycle of the A.-C. power voltage input, the D.-C. input M. M. F. subtracts from the M. M. F. of the bias and the M. M. F. of the power winding A.-C. in the first core and adds to them in the second core.

Therefore, the net output induced in the winding 22 is reversed in phase from that obtained before the polarity was reversed. As before, during the second half cycle of the A.-C. power, no output is produced.

The final output going through the transformer 11 then inherently approaches an A.-C. of fundamental frequency, which is reversible. As a practical matter, the output smooths out to be more nearly a full sine wave due to the action of the transformer. The speed of response of this circuit is extremely fast, because even with no D.-C. input, each core is driven to a high level saturation every other half cycle, causing low inductance, and, if the cores become saturated completely, a time constant of one cycle is obtained. Practically speaking, the time constant is somewhat greater than this because the cores do not become completely saturated.

It should be emphasized at this time that providing a separate circuit for the D.-C. bias in this type of magamp offers unique advantages appreciated for the first time in my invention. Basically it was determined as desirable to provide a potentiometer 27 to divide the total M. M. F. produced by the bias windings between the two cores. This is the logical place to adjust the null condition of the saturable reactor so that output will be reduced to a minimum when the input signal is at a minimum.

I next perceived that if a potentiometer were used to divide the D.-C. bias of source 6 between the total number of windings required for the function of the bias circuit the adjustment would be too coarse. Also the D.-C. power drain on source 6 was material. Therefore, I devised the arrangement of breaking the bias circuit into two sections, with two windings to each section. I could make the one section the larger by number of turns to the winding and place the windings in series with each other. The second section could be made the smaller by number of turns to the winding and the windings placed in parallel with each other. Potentiometer 27 would then divide the energy of source 6 between the two windings of the second section to set the null condition. This arrangement is seen as unique in this type of magamp and promotes the practical embodiment of the type.

Two features of the power circuit can now be given attention. Potentiometer 28, of a very high order of resistance, is established to divide the output of transformer 24 between power windings 23 and 23A. Adjustment of this potentiometer eliminates the out-of-phase, or quadrature, component which would tend to paralyze the motor near the null condition of the magamp. The necessary adjustment of the phase of the A.-C. power, in order to obtain the necessary phase relationship at motor 14, discussed supra, is found in phase-shifting capacitor 29.

Figure 2:
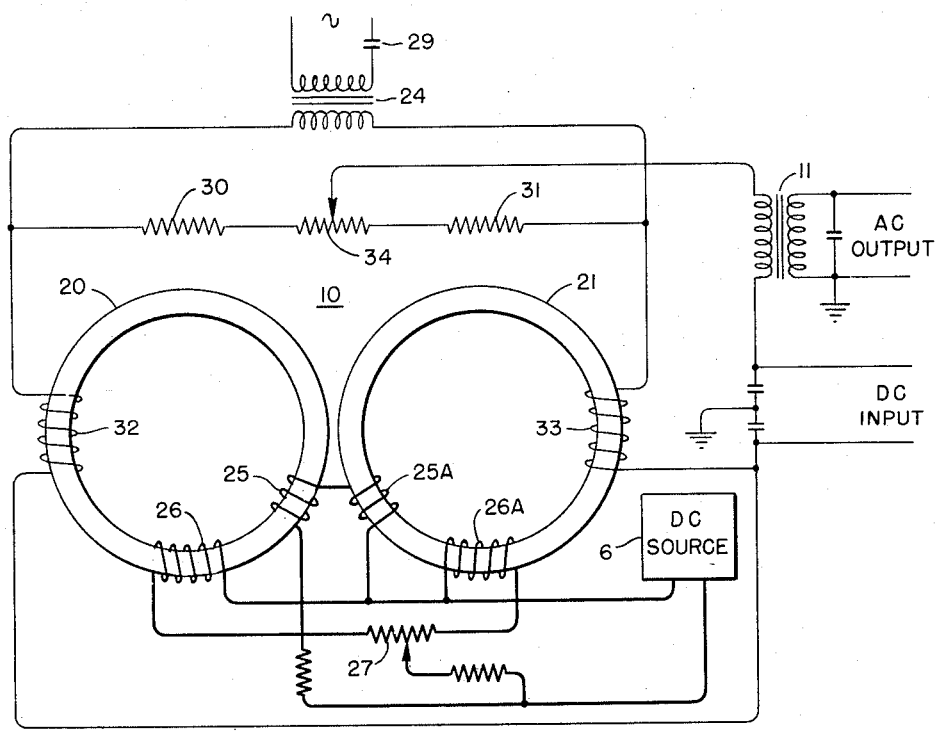
Fig. 2 is an alternate arrangement of the circuit of the magnetic amplifier useful in the system of Fig. 1 and incorporating the invention.

In Fig. 2 is represented a bridge circuit to which the teachings of my invention have been applied. The view may be taken that either Hornfeck 2,529,450 has had the present invention grafted thereon, or the circuit disclosed in Miller et al. 2,472,980 has had the present invention added thereto. From either viewpoint the objects of the present invention are obtained by the disclosure of Fig. 2.

The Miller et al. patent teaches how the bridge circuit of Fig. 2 can be used to produce an output voltage having the second harmonic of the energizing line voltage. Aplication of D.-C. bias under the teachings of the present disclosure cause the output voltage to be given the fundamental frequency of the line voltage. The bias is applied by two sections of windings for the reason explained in connection with Fig. 1.

In a study of the circuit of Fig. 2, the components performing the same functions in both Fig. 1 and Fig. 2 have been given the same designations. Therefore, the magamp, as an entity, is found at 10 with cores 20 and 21 forming its nucleus. The bias circuit is arranged precisely as before with windings 25, 25A and 26, 26A and potentiometer 27 energized from constant D.-C. source 6.

The input-output circuit is the variation from the Fig. 1 arrangement and is basically a Wheatstone bridge with resistance legs 30, 31 and winding legs 32, 33. Power transformer 24 is in one conjugate of this bridge while the D.-C. input signal is in the opposite conjugate, along with output transformer 11.

The primary of output transformer 11 has the voltage applied thereto, as the output of the bridge, whose frequency is a fundamental of the line voltage supply to power transformer 24. A potentiometer 34 is now arranged to divided the bridge halves in the output conjugate for adjustment of the quadrature component.

Package magamp structures are presently being exploited on the market to a fairly large extent. I have conducted a study of this literature and desire to emphasize distinctions between these devices and one embodying the present invention. Many of the exploited magamp devices are deliberately designed to give a linear input-output relationship. Use of core materials having linear hysteresis loops is fundamental to obtaining this characteristic. However, the preferred embodiment of the present invention employs non-linear, high permeability, magnetic cores in order to deliberately attain a non-linear input-output characteristic evidencing very high gain near the null condition of the magamp.

Figure 3:
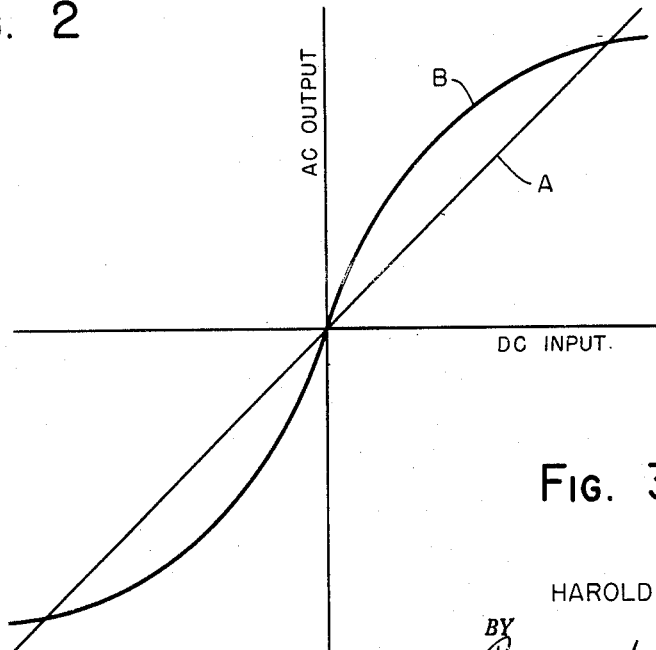
Fig. 3 is a plot of comparative performance characteristics between the inventive circuit and prior art devices.

In Fig. 3 a comparative analysis between the characteristics of the straight line devices and the present non-linear embodiment of the present invention is illustrated. Curve A illustrates the plot of a straight-line gain magamp. Curve B represents the performance of the preferred embodiment of the present invention. I do not wish to imply that the straight line performance by magamps has, inherently, less utility than the preferred embodiment of the present invention. There are certain applications where this straight line performance by presently offered magamps has advantages. However, these specifications are secondarily suited for null balance systems.

It is inherently desirable that systems for recording and control operate on each side of a null condition with a highest possible gain obtained close to the null point. Although the straight line devices have consistency and straight line performance they are not as desirable from the stand-point of gain near the null condition.

What I claim as new, and desire to secure by Letters Patent of the United States is:

1. A reactor for inverting a single low-level D.-C. signal of reversible polarity into an A.-C. signal of reversible phase, comprising, two independent magnetic core paths, an A.-C. source of power for producing equal M. M. F.'s in each of the two magnetic paths in predetermined sense during each half cycle, multi-purpose windings connected to carry the low-level D.-C. signal and arranged in respect to said core paths to provide M. M. F.'s to aid the A.-C. M. M. F.'s in one path and oppose the A.-C. M. M. F.'s in the other path during one half cycle and vice versa during the other, a circuit for detecting the A.-C. voltage induced into the multi-purpose windings at the fundamental frequency of said A.-C. source, bias windings connected for carrying D.-C. of fixed polarity and magnitude and arranged in respect to said core paths to produce M. M. F.'s to aid the D.-C. signal M. M. F.'s in one path and oppose the D.-C. signal M. M. F.'s in the other path, and means responsive to the A.-C. voltage induced in the detection circuit for manifesting the value of the low level D.-C. signal.

2. The inverter of claim 1 wherein a single source of D.-C. is provided for the bias windings which comprise four windings arranged in pairs with one of each pair cooperating with only one of said core paths and with one pair having a relatively large number of turns in series with each other and the other pair having a relatively small number of turns in parallel with each other, and a potentiometer connected to divide the D.-C. between the windings of this other pair for balance adjustment of the total bias.

3. The inverter of claim 1 wherein the energizing windings are separate and are divided substantially equally between the two core paths and are connected in series, a potentiometer resistance shunting said A.-C. source and a slider for said resistance connected between said separate windings.

4. A reactor for inverting a single low-level D.-C. signal of reversible polarity into an A.-C. signal of reversible phase, comprising, two independent magnetic core paths, energizing windings connected to an A.-C. source of power for producing equal M. M. F.'s in each of the two magnetic paths in predetermined sense during each half cycle, bias windings connected for carrying D.-C. of fixed polarity and magnitude arranged in respect to said core paths to produce M. M. F.'s to aid the A.-C. M. M. F.'s in both paths during one half cycle and to oppose them during the other half cycle, dual purpose windings connected to carry the low level D.-C. signal and arranged in respect to said core paths to provide M. M. F.'s to aid the A.-C. M. M. F.'s in one path and oppose them in the other during one half cycle and vice versa during the other, a circuit in series with said D.-C. signal and said dual purpose windings to detect the A.-C. voltage induced in the latter at the fundamental frequency of said A.-C. source, and means responsive to the induced A.-C. voltage for manifesting the value of the low level D.-C. signal.

5. The inverter of claim 4 wherein the two independent magnetic core paths are each provided in a single continuous core having only one possible path therein.

6. The reactor as defined in claim 1 in which the A.-C. source of power is shunted by a pair of series connected resistances and by the series connected said multi-purpose windings to form a bridge, said A.-C. source of power forming one conjugate of said bridge and the other including the source of low-level D.-C. signal and output means for the induced A.-C. voltage arranged in series relation.

References Cited in the file of this patent

UNITED STATES PATENTS

| 1,181,556 | Von Arco | May 2, 1916 |
| 2,576,529 | McKenny et al. | Nov. 27, 1951 |
| 2,678,419 | Bennett | May 11, 1954 |

FOREIGN PATENTS

| 657,127 | Germany | Feb. 28, 1938 |